United States Patent [19]
Chen et al.

[11] Patent Number: 5,191,009
[45] Date of Patent: Mar. 2, 1993

[54] PROCESS FOR PRODUCING STABLE LATEX

[75] Inventors: Sun-Lin Chen; Ramesh N. Gujarathi; Susan M. Prentice, all of Akron, Ohio

[73] Assignee: The Goodyear Tire & Rubber Company, Akron, Ohio

[21] Appl. No.: 584,985

[22] Filed: Sep. 20, 1990

[51] Int. Cl.$^5$ .............................................. C08F 2/16
[52] U.S. Cl. ................................... 524/460; 524/458; 524/710; 524/833
[58] Field of Search ................ 524/460, 710, 833, 458

[56] References Cited

U.S. PATENT DOCUMENTS

| | | | |
|---|---|---|---|
| 4,064,092 | 12/1977 | Burroway et al. | 526/216 X |
| 4,097,440 | 6/1978 | Maximovich et al. | 260/31.4 R |
| 4,153,592 | 5/1979 | Burroway et al. | 260/29.6 N |
| 4,189,561 | 2/1980 | Burroway et al. | 526/317 |
| 4,230,609 | 10/1980 | Burroway et al. | 260/29.6 TA |
| 4,474,926 | 10/1984 | Burroway | 524/710 |
| 4,477,623 | 10/1984 | Pons et al. | 524/710 |
| 4,569,965 | 2/1986 | Engel et al. | 524/833 X |
| 4,609,704 | 9/1986 | Hausman et al. | 524/710 |
| 4,794,139 | 12/1988 | Braden et al. | 524/117 |
| 4,868,259 | 9/1989 | Burroway et al. | 524/460 X |
| 4,968,741 | 11/1990 | Burroway et al. | 524/710 |
| 4,983,656 | 1/1991 | Ito et al. | 524/710 X |
| 5,041,495 | 8/1991 | Schwerzel et al. | 524/833 X |

FOREIGN PATENT DOCUMENTS 0728229  2/1966  Canada ................................ 524/833

Primary Examiner—Joseph L. Schofer
Assistant Examiner—J. M. Reddick
Attorney, Agent, or Firm—Alvin T. Rockhill

[57] ABSTRACT

The subject invention discloses a process for producing a neutralized latex that is useful in the manufacture of water reducible coatings which involves:

(1) free radical aqueous emulsion polymerizing at a pH of less than about 3.5, a monomer mixture which comprises based on 100 weight percent monomers: (a) from about 45 to about 85 weight percent vinyl aromatic monomers, (b) from about 15 to about 50 weight percent of at least one alkyl acrylate monomer, and (c) from about 1 to about 6 weight percent of at least one unsaturated carbonyl compound; in the presence of about 0.5 to 4.0 phm at least one phosphate ester surfactant; in the presence of about 0.5 to 4.0 phm of at least one water insoluble nonionic surface active agent to produce a latex; and in the presence of at least one seed polymer which is contains of repeat units which are derived from about 45 to about 85 weight percent vinyl aromatic monomers, from about 15 to about 50 weight percent alkyl acrylate monomers, and from about 1 to about 6 weight percent unsaturated carbonyl compounds; and (2) neutralizing the latex with ammonia to a pH which is within the range of about 7 to about 10.5 to produce the neutralized latex.

17 Claims, No Drawings

PROCESS FOR PRODUCING STABLE LATEX

BACKGROUND OF THE INVENTION

Most conventional coating resins are insoluble in water. Therefore, in general practice they have been dissolved in a suitable organic solvent or dispersed in water with the aid of an emulsifying agent or surfactant in order to provide a coating composition suitable for application to a substrate surface. A serious disadvantage of organic solvent solutions is that they are potentially toxic, flammable, and environmental pollutants.

Water reducible coatings do not present these problems and are, therefore, highly desirable. For this reason various water reducible coating resins, such as the one described in U.S. Pat. No. 4,474,926, have been developed. Water reducible coatings which utilize such resins have been developed for a variety of purposes and have been widely accepted in many applications such as highway striping paint.

There is a need for a coating for metal substrates which provide improved corrosion and rust resistance. Such coatings could be, for example, beneficially utilized in the automotive industry. It would be particularly desirable for such coatings to be of the water reducible type.

For purposes of this patent application, an aqueous coating system is considered to be a colloidal dispersion of a resin in water which can be reduced by the addition of water and which forms a durable coating when applied to a substrate surface. The term aqueous coating system is used herein interchangeably with the term water reducible coating. Other names which are sometimes applied to water reducible coatings are water born, water solubilized, and water dilutable.

U.S. Pat. No. 4,968,741, discloses a process for producing a neutralized latex that is useful in the manufacture of water reducible coatings which comprises:

(1) free radical aqueous emulsion polymerizing at a pH of less than about 3.5 a monomer mixture which comprises, based on 100 weight percent monomers: (a) from about 45 to about 85 weight percent vinyl aromatic monomers, (b) from about 15 to about 50 weight percent of at least one alkyl acrylate monomer, and (c) from about 1 to about 6 weight percent of at least one unsaturated carbonyl compound; in the presence of about 0.5 to 4.0 phm at least one phosphate ester surfactant and in the presence of about 0.5 to 4.0 phm of at least one water insoluble nonionic surface active agent to produce a latex; and (2) neutralizing the latex with ammonia to a pH which is within the range of about 7 to about 10.5 to produce the neutralized latex.

The latices made utilizing the technique of U.S. Pat. No. 4,968,741 are outstanding for utilization in the formulation of coatings having improved moisture vapor transmission resistance and water spotting resistance. When applied to metal substrates, coating formulations made with such latices provide excellent corrosion and rust resistance. The latices described in U.S. Pat. No. 4,968,741 have proven to be extremely difficult to synthesize in large scale commercial operations. Attempts to synthesize such latices in large polymerization vessels, such as 500 gallon reactors, has resulted in severe coagulum formation.

SUMMARY OF THE INVENTION

The subject invention relates to a technique for preparing stable latices of the type described in U.S. Pat. No. 4,968,741 without significant levels of coagulum formation. This technique is based upon the unexpected discovery that stable latices can be prepared by conducting the polymerization in the presence of about 1 to about 15 phm of a seed polymer. The seed polymer utilized will typically be comprised of the same monomeric constituents and have the same monomeric ratios as the latex being synthesized.

The subject invention more specifically discloses a process for producing a neutralized latex that is useful in the manufacture of water reducible coatings which comprises:

(1) free radical aqueous emulsion polymerizing at a pH of less than about 3.5 a monomer mixture which comprises, based on 100 weight percent monomers: (a) from about 45 to about 85 weight percent vinyl aromatic monomers, (b) from about 15 to about 50 weight percent of at least one alkyl acrylate monomer, and (c) from about 1 to about 6 weight percent of at least one unsaturated carbonyl compound; in the presence of about 0.5 to 4.0 phm at least one phosphate ester surfactant and in the presence of about 0.5 to 4.0 phm of at least one water insoluble nonionic surface active agent to produce a latex; and (2) neutralizing the latex with ammonize to a pH which is within the range of about 7 to about 10.5 to produce the neutralized latex.

DETAILED DESCRIPTION OF THE INVENTION

The latices of this invention are prepared by free radical emulsion polymerization. The charge compositions used in the preparation of the latices of this invention contain monomers, at least one phosphate ester surfactant, at least one water insoluble nonionic surface active agent, at least one seed polymer, and at least one free radical initiator. The monomer charge composition used in such polymerizatios is comprised of (a) from about 45 to about 85 weight percent vinyl aromatic monomers, (b) from about 15 to about 50 weight percent of at least one alkyl acrylate monomer, and (c) from about 1 to about 6 weight percent of at least one unsaturated carbonyl compound. It is preferred for the polymer being synthesized to be comprised of from about 60 to about 80 weight percent vinyl aromatic monomers, from about 20 to about 40 weight percent alkyl acrylate monomers, and from about 1.5 to about 5 weight percent unsaturated carbonyl compounds. It is more preferred for the polymer to be comprised of from about 65 weight percent to 75 weight percent vinyl aromatic monomers, from about 22 to about 30 weight percent alkyl acrylate monomers, and from about 2 to about 4 weight percent unsaturated carbonyl compounds.

Some representative examples of vinyl aromatic monomers which can be used include styrene, alpha-methyl styrene, and vinyl toluene. Styrene and alpha-methyl styrene are the preferred vinyl aromatic monomers. Due to its relatively low cost styrene is the most preferred vinyl aromatic monomer. The alkyl acrylate monomers which can be employed have alkyl moieties which contain from 2 to about 10 carbon atoms. The alkyl acrylate monomer will preferably have an alkyl moiety which contains from 3 to 5 carbon atoms. Normal butyl acrylate is a highly preferred alkyl acrylate monomer. Some representative examples of unsaturated carbonyl compounds which can be utilized include acrylic acid, methacylic acid, fumaric acid, itaconic acid, maleic acid, and maleic anhydride. The preferrred unsaturated carbonyl monomers include acrylic acid, methacrylic acid, fumaric acid, an ditaconic acid. Acrylic acid and methacrylic acid are the most preferred unsaturated carbonyl compounds. In most cases, it is advantageous to use a combination of both acrylic acid and methacrylic acid as the unsaturated carbonyl compound component used in making the latex. For instance, the utilization of about 1 to about 3 weight percent acrylic acid with about 0.5 to about 1.5 weight percent methacrylic acid results in the latex having improved freeze-thaw stability. For example, the utilization of about 2% acrylic acid with 1% methacrylic acid as the unsaturated carbonyl compound component results in the latex produced being capable of withstanding more than five (5) freeze-thaw cycles. It is important for latices which are shipped through cold regions of the world to have this improved freeze-thaw stability.

The charge composition used in the preparation of the latices of this invention will contain a substantial quantity of water. The ratio between the total amount of monomers present in the charge composition and water can range between about 0.2:1 and about 1.2:1. It is generally preferred for the ratio of monomers to water in the charge composition to be within the range of about 0.8:1 and about 1.1:1. For instance, it is very satisfactory to utilize a ratio of monomers to water in the charge composition of about 1:1.

The charge composition will also contain from about 0.5 phm (parts per hundred parts by weight of monomer) to about 4.0 phm of at least one phosphate ester surfactant. It is normally preferred for the phosphate-ester surfactant to be present in the polymerization medium at a level within the range of about 1 phm to about 3.5 phm. It is generally more preferred for the charge composition to contain from about 2 to about 3 phm of the phosphate ester surfactant.

The phospahte ester surfactants that are useful in this invention are commercially available from a wide variety of sources. For instance, GAF Corporation sells phosphate ester surfactants under the tradename of Gafac TM RE-410, Gaftax TM CD-169, and Gaftax TM DP-100. Some other phosphate-ester surfactants that are commercially available include Indoil TM (BASF Wyandotte Corporation), Emphos TM (Witco Chemical Corporation), Cyclophos TM (Cyclochemicals Corporation), Tryfac TM (Emery Industries), and Alcamet TM (Lonza, Inc.).

The phosphate ester surfactants used in the process of this invention can have the structural formula:

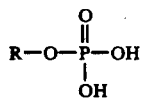

where R is an alkyl group or an aryl group. As a general rule, R will contain from about 4 to about 40 carbon atoms. It is preferred for such phosphate ester surfactants to be in the form of partially neutralized salts. Monobasic salts and nonionic compounds can be utilized as well as such dibasic salts. For example, Gafac TM RE-410, which is a preferred phosphate ester surfactant, is a complex mixture of (1) a dibasic salt having the structural formula:

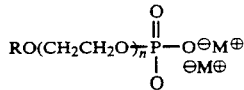

(2) a monobasic salt having the structural formula

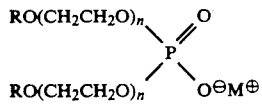

and (3) a nonionic compound having the structural formula:

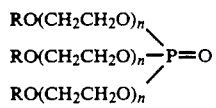

In the case of Gafac TM RE-410, n is 4, and R represents nonyl phenol.

The charge composition used in the preparation of the latices of this invention also contains from about 0.5 phm to about 4 phm of at least one water insoluble nonionic surface active agent. The water insoluble nonionic surface active agent will preferably be present in the polymerization medium at a level within the range of about 1 phm to about 3.5 phm and will more preferably be present in an amount ranging from about 2 phm to about 3 phm. The water insoluble nonionic surface active agent will normally be a fatty alcohol or a nonionic surfactant.

The fatty alcohol utilized will typically be of the structural formula R—OH wherein R represents an alkyl group containing from 5 to 22 carbon atoms. In most cases, R will be an alkyl group containing from 10 to 18 carbon atoms. It is generally preferred for the fatty alcohol to contain from 12 to 14 carbon atoms. For instance, lauryl alcohol si a particularly preferred fatty alcohol.

The nonionic surfactants which can be utilized as the water insoluble nonionic surface active agent will normally have a hydrophile-lipophil balance (HLB) number of less than about 12. It is generally preferred for such nonionic surfactants to have a HLB number of less than about 10. HLB numbers are indicative of a surfactant's emulsification behavior and relate to the balance between the hydrophilic and lipophilic (hydrophobic) portions of the molecule. HLB numbers are further described in Griffin, W. C., J. Soc. Cosmet. Chem. 1, 311 (1949) which is incorporated herein by reference. The HLB number of a given surfactant generally decreases with increasing temperatures. The HLB numbers referred to herein are determined or calculated for the reaction temperature employed. Water insoluble nonionic surfactants which contain low levels (from 1 to about 8) ethylene oxide repeat units can be employed. These water insoluble nonionic surfactants can have the structural formula:

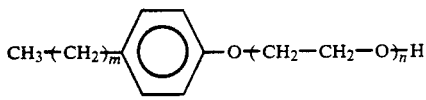

wherein n is an integer from 1 to about 8 and wherein m is an integer from about 6 to about 12. It is normally preferred for m to be 8 or 9. The HLB number of such compounds increases with increasing levels of ethylene oxide incorporation. The HLB number of such compounds increases as a function of n as follows:

| n | HLB Number |
|---|---|
| 1 | 3.6 |
| 3 | 7.8 |
| 4 | 10.4 |
| 10 | 13.5 |
| 16 | 15.8 |
| 30 | 17.3 |
| 40 | 17.9 |

Polyols which are copolymers of ethylene oxide and propylene oxide can also be employed as the water insoluble nonionic surfactant. Such polyols have the structural formula:

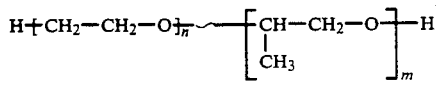

wherein n and m are integers, wherein the ratio of m to n is at least about 5:1, and wherein ~ indicates that the distribution of monomeric units can be random. The polyols which can be used also have molecular weights of at least about 1500. The polyols which are preferrd contain less than about 10% bound ehtylene oxide (have a ratio of m to n of at least about 10:1).

The use of larger amounts of phosphate ester surfactants in the polymerization medium leads to better latex stability. However, the utilization of larger amounts of phosphate ester surfactants also leads to greater blushing in the ultimate coating and consequently less rust and corrosion resistance. The utilization of greater amounts of the water insoluble nonionic surface active agent leads to less latex stability, but also results in less blushing and more water resistance (less water permeability). Accordingly, it is important to balance the amounts of phosphate ester surfactant and fatty alcohol utilized in the charge composition.

The charge composition used in the synthesis of the latices of this invention further contains from about 1 to about 15 phm of a seed polymer. The seed polymer is comprised of repeat units which are derived from about 45 to about 85 weight percent vinyl aromatic monomers, from about 15 to about 50 weight percent alkyl acrylate monomers, and from about 1 to about 6 weight percent unsaturated carbonyl compounds. The seed polymer will preferably be comprised of the monomers and have the monomer ratios utilized in the latex being synthesized. Normally, a portion of the latex prepared in a prior synthesis of a latex of the same type is utilized as the seed polymer.

The initial quantity of seed latex can be prepared in small scale by utilizing the technique described in U.S. Pat. No. 4,968,741. After the large commercial scale polymerizations of this invention have been successfully carried out, it is appropriate to simply set aside a portion of the latex prepared for future use as a seed latex. From about 1 phm to about 15 phm of the seed polymer will be utilized in the charge compositions of this invention. It is normally preferred for the seed polymer to be present in the polymerization medium at a concentration which is within the range of about 2 phm to about 10 phm. It is typically most preferred for the seed polymer to be present in an amount which is within the range of about 3 phm to about 5 phm.

The free radical aqueous emulsion polymerizations used in preparing the latices of this invention are initiated with at least one free radical generator. There free radical generator is normally employed at a concentration within the range of about 0.01 phm to about 1 phm. The free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, acetyl peroxide, methyl ehtyl ketone peroxide, succinic acid peroxide, dicetyl peroxymaleic acid, t-butyl peroxyacette, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutylronitrile, 2-t-butylazo-1-cyanocylohexane, 1-t-amylazo-1-cyanocyclohexane, and the like, the various alkyl perketals, such as 2,2-bis-(t-butyl-peroxy)butane, and the like. Water soluble peroxygen free radical initiators are especially useful in such aqueous polymerizations.

The emulsion polymerizations of this invention are typically carried out at the temperature ranging between about 125° F. (52° C. and 190° F. (88° C.). At temperatures above about 88° C. alkyl acrylate monomers, such as butyl acrylate, have a tendency to boil. Thus, a pressurized jacket would be required for heating such alkyl acrylate monomers to temperatures in excess of about 88° C. On the other hand, the polymerization reaction proceeds at a very slow rate at temperatures below about 52° C. The slow rate of polymerization experienced at temperatures below about 52° C. results in the polymer having a nonuniform distribution of repeat units in its backgone. The slow rates of polymerization experienced at such low temperatures are also undesirable because they greatly reduce the throughput of the polymerization reactor.

It is generally preferred for the polymerization temperature to be maintained within the range of about 150° F. (66° C.) to 180° F. (82° C.). It is generally more preferred for the reaction temperature to be controlled within the range of about 160° F. (71° C.) to about 170° F. (77° C.). It is important for the polymerization to be conducted at a pH which is below about 3.5 so that a water sensitive polymer is not produced. It is preferred for the pH of the polymerization medium to be maintained at a level of about 3.0 or less throughout the polymerization. The initial monomer charge composition will preferably have a pH which is within the range of about 3.0 to about 3.5. As the polymerization proceeds, the pH of the polymerization medium will drop naturally. It is usually desirable to adjust the pH of the polymerization medium as the polymerization proceeds by the addition of ammonia to maintain a pH of at least about 2.0. In most cased the polymerization medium will be kept at a pH of about 2.0 to about 3.5. It is normally preferred to maintain the pH of the polymerization medium within the range of about 2.4 to about 3.0. The polymerization medium is continuously agitated with axial flow turbine (AFT) type agitation during the course of the reaction utilizing a tip speed of about 4 feet per second to about 7 feet per second (122 cm/sec. to 213 cm/sec.). The tip speed used will preferably be within the range of 5 feet per second to 6 feet per second (152 cm/sec. to 183 cm/sec.). The tip speed will most preferably be within the range of 5.3 feet per second to 5.7 feet per second (162 cm/sec. to 174 cm/sec.). The tip speed is the product of the radius of the AFT impeller and the angular velocity in revolutions per second.

In commercial operations it is typically desirable to add about 15% to abut 25% of the monomers in an initial charge. The initial charge is then allowed to react for a period of about 30 minutes to about 60 minutes. At this point, the seed polymer latex is added. Then the balance of the monomers to be charged can be continuously charged into the reaction zone at a rate which is sufficient to maintain a reaction temperature within the desired temperature range. By continuously adding the monomers to the reaction medium while maintaining a relatively constant reaction temperature, very uniform polymers can be prepared. The monomers will be continuously added over a period of about 2.5 hours to 4 hours. It is preferred for the monomers to be added over a period of 3.0 hours to 3.5 hours.

In accordance with the process of this invention the latex synthesized is then neutralized with ammonia to a pH within the range of about 7 to about 10.5. The ammonia will typically be added in the form of ammonium hydroxide ($NH_4OH$). It is normally preferred for the latex to be neutralized to a pH within the range of 8 to 10 and more preferred for the latex to be neutralized to a pH within the range of about 9.0 to about 9.5. This can be accomplished by simply dispersing ammonia throughout the latex to produce neutralized latex.

The latex formed can be diluted with additional water to the concentration (solids content) that is desired. This latex can be used in the preparation of water reducible coatings using techniques well-known to those skilled in the art. Generally, various pigments and plasticizers are added to the latex in the preparation of the water reducible coating. Such a latex can also be coagulated and dried using techniques well-known to those skilled in the art. The dry resin produced can then be used in the manufacture of water reducible coatings if it si preferable to use a dry resin. Poor adhesion is a problem that is sometimes encountered with water reducible resins. The adhesion of coatings made with water reducible resins to substrates can be greatly improved by the addition of a plasticizer.

A film forming, water reducible composition can be prepared utilizing a mixture of the resin with suitable coalescing solvent and plasticizer. It is preferred for the coalescing solvent to be at least water miscible and even more preferably for it to be water soluble. Of the various solvents which can be used, generally the ethylene glycol monobutyl ether, ethylene glycol monoethyl ether, diethylene glycol monomethyl ether, diethylene glycol monoethyl ether and diethylene glycol monobutyl ether are preferred. It should be noted that the solvent and plasticizer can be mixed directly with the resin in tis water emulsion or latex without its normal recovery in its dried form, in most instances, if desired. In such an operation, the composite would automatically be in a water reduced form, when sufficient ammonia is used.

Of the various plasticizers, it is desired that one be selected which is liquid at room temperature such as 25° C. and have a sufficiently high boiling point, preferably at least 100° C., and even more preferably, at least 150° C., so that they do not volatilize from the coating composition when applied to a substrate. Indeed, the plasticizer should enhance the water insolubility of a dried coating of the coalesced resin. Further, the plasticizer, or mixture of plasticizers, must be characterized by being compatible with the resin itself. For this characterization, a solubility parameter in the range of about 8 to about 16 is required. Such solubility parameter is of the type described in the Encyclopedia of Polymer Science and Technology, Volume 3, Page 854, 1965, John Wiley and Sons, Inc., which is simply determined by the equation $$\delta = (\Sigma F)/V = F/MW/d$$

where
- $\delta$ = solubility parameter
- F = sum of the pertinent molar attraction constants of groups determined by Small, P A [(J Appl Chem 3, 71 (1953)]
- V = Molar volume at 25° C.
- MW = molecular weight
- d = density at 25° C.

Various plasicizers can be used for this purpose. They can, for example, be of the type listed in the Federation Series on Coatings Technology, Unit Twenty-two, entitled "Plasticizers," published April, 1974, so long as they fulfill the melting point, boiling point and compaibility requirements.

Representative of various plasticizers are cyclic plasticizers such as phosphoric acid esters, phthalic anhydride esters and trimellitic acid esters as well as N-cyclohexyl-p-toluene sulfonamide, dibenzyl sebacate, diethylene glycol dibenzoate, di-t-octylphenylether, dipropane diol dibenzoate, N-ethyl-p-tolune sulfonamide, isopropylidenediphenoxypropanol, alkylated naphthalene, polyethylene glycol dibenzoate, o-p-toluene sulfonamide, trimethylpentanediol dibenzoate and trimethylpentanediol monoisobutyrate monobenzoate.

Representative of various acyclic plasticizers are adipic acid esters, azelaic acid esters, citric acid esters, acetylcitric acid esters, myristic acid esters, phosphoric acid esters, ricinoleic acid esters, acetylricinoleic acid estrs, sebacic acid esters, stearic acid esters, epoxidized esters, as well as 1,4-butne diol dicaprylate, butoxyethyl pelargonate di[(butoxyethyoxy)ethyxy] methane, dibutyl tartrate, diethylene glycol dipelargonate, diisooctyl diglycolate, isodecyl nonanoate, tetraethylene glycol di(2-ethylbutyrte), triethylene glycol di(2-ethyl-hexanoate), triethylne glycol dipelargonate and 2,2,4-trimethyl-1,3-pentane diol diisobutyrate.

Additional various plasticizers, cyclic, acyclic, and otherwise, include chlorinated paraffins, hydrogenated terphenyls, substituted phenols, propylene glycols, polypropylene glycol esters, polyethylene glycol esters, melamines, epoxidized soys, oils, melamines, liquid, hydrogenated abietate esters, epoxytallate esters, alkyl phthalyl alkyl glycolates, sulfonamides, sebacate esters, aromatic epoxies, aliphatic epoxies, liquid poly(a-methyl styrene), maleate esters, mellitate esters, benzoates, benzyl esters, tartrates, succinates, isophthalates, orthophthalates, butyrates, fumarates, glutarates, dicaprylates, dibenzoates and dibenzyl esters. It is to be appreciated that relatively low molecular weight polymers and copolymers derived from monoolefins containing 4 to 6 carbon atoms, mixtures of diolefins and monoolefins containing 4 to 6 carbon atoms as well as such hydrocarbons and hydrocarbon mixtures with styrene and/or amethyl styrene can also be used.

The preferred esters are prepared from the reaction of carboxylic and dicarboxylic acids including fatty acids, such as the phthalic acids, benzoic acid, dibenzoic acid, adipic acid, sebacic acid, stearic acid, maleic acid, tartaric acid, succinic acid, butyric acid, fumaric acid and glutaric acid with hydrocarbon diols, preferably saturated hydrocarbon diols, having about 7 to 13 carbon atoms.

Representative of various phosphoric acid esters are cresyl diphenyl phosphate, tricresyl phospahte, dibutyl pehnyl phosphate, diphenyl octyl phosphate, methyl diphenyl phosphate, tributyl phosphate, triphenyl phosphate, tri(2-butoxyethyl) phosphate, tri(2-chloroethyl) phosphate, tri-2(chloropropyl) phosphate and trioctyl phosphate.

Representative of various phthalic anhydride esters are butyl octyl phthalate, butyl 2-ethylhexyl phthalate, butyl n-octyl phthalate, dibutyl phthalate, diethyl phthalate, diisodecyl phthatlate, dimethyl phthalate dioctyl phthalates, di(2-ethylhexyl) phtahlate, diisooctyl phthalat, di-tridecyl phthalate, n-hexyl n-decyl phtalate, n-octyl n-decyl phtahalte, alkyl benzyl phthaalte, bis(4-methyl-1,2-pentyl) phthalate, butyl benzyl phthalate, butyl cyclohexyl phthalate, di(2-butoxyethyl) phthalate, dicyclohexyl isodecyl phthalte, dicyclohexyl phthalate, diethyl isophthalate, di n-heptyl phthalate, dihexyl phthalate, diisononyl phthalate, di(2-methoxyethyl)phthalate, dimethyl isophthatlate, dinonyl phthalate, dioctyl phthalates, dicapryl phthalate, di(2-ethylhexyl) isophtahtlat, mixed diocytl phthalates, diphenyl phthalate, 2-(ethylhexyl) isobutyl phthatlate, butyl phthalyl butyl glycolate, ethyl (and methyl) phthalyl ethyl glycolate, polypropylene glycol bis(amyl) phthalte, hexyl isodecyl phthatlate, isodecyl tridecyl phthatlate and isooctyl isodecyl phthalate.

Representative of trimellitic acid esters are triisooctyl trimellitate, tri-n-octyl n-decyl trimellitate, trioctyl trimellitate, tri(2-ethylhexyl) trimellitate, tri-n-hexyl n-decyl trimellitate, tri-n-hexyl trimellitate, triisodecyl trimellitate and triisononyl trimellitate.

Representative of various adipic acid esters are di[2-(2-butoxyethoxy) ethyl]adipate, di(2-ethylhexyl adipate, diisodecyl adipate, dioctyl adipates (including diisooctyl adipate) n-hexyl n-decyl adipate, n-octyl n-decyl adipate, and di-n-heptyl adipate.

Representative examples of sebacid acid esters are dibutyl sebacate, di(2-ethylhexyl)sebacate, dibutoxyethyl sebacate, diisooctyl sebacate and diisopropyl sebacate.

Representative examples of azelaic acid esters ar di(2-ethylhexyl)acelate dicyclohexyl acelate, diisobutyl azelate and diisooctyl azelate.

In the practice of this invention, the water reducible composition of resin, plasticizer and coalescing solvent, if used, is water reduced by neutralizing the carboxyl groups of the resin with ammonia and mixing with water. The resulting dispersion or solution can generally be characterized by being stable without appreciable, if any, precipitation of the resin for a period of at least thirty (30) days and preferably for a period of at least 365 days or more at about 25° C.

Generally, for the purpose of this invention about 100 to about 400 parts by weight water are used per 100 parts by weight neutralized resin, although more or less water can usually be used depending on whether a high or low viscosity dispersion or solution is desired or whether a high or low solids content is desired. It also depends on the type and amount of coalescing solvent and plasticizer used. The water reduced coating composition, as an aqueous dispersion or solution, is applied as a coating onto a suitable substrate such as wood, masonry, various plastics and various metals. The water, ammonia, and coalescing solvent are evaporated from the coating, usually at a temperature in the range of abut 20° C. to about 100° C., preferably about 25° C. to about 50° C. to leave a substantially water insoluble coating of the coalesced resin and plasticizer. Generally such a coating can be prepared and applied without the need for additional hardening agents or curvatives to decrease the water sensitivity.

Therefore, it si an important feature of this invention that a durable coating is formed on a substrate through the preparation of a particular resin having balanced hydrophilic an hydrophobic elements, preferably with a further balance of hard and soft segments, and the formation of wa water reduced composition of such resin with a combination of coalescing solvent and compatible plasticizer.

The practice of the invention is more fully illustrated by reference to the following examples The practice of the invention is more fully illustrated by reference to the following examples which are intended to be illustrative rather than limiting of the scope of the invention. All parts are by weight unless otherwise indicated.

Seed Polymer Latex Preparation

In this experiment, a seed polymer latex was prepared in a ten gallon (37.8 liter) reactor using the technique described in U.S. Pat. No. 4,968,741. The reactor utilized in this experiment was equipped with baffles for agitation and was operated at 150 rpm (revolutions per minute). A buffer solution, an initiator solution, and a monomer solution were made for utilization in the polymerization. The buffer solution was made by mixing 15.6 kilograms of water with 340 grams of the sodium salt of an alkyl phosphate ester having a pH of about 3 and 340 grams of dodecanol. The initiator solution was prepared by mixing 1.36 kilograms of water and 68 grams of ammonium persulfate. The monomer solution was prepared by mixing 9.66 kilograms of styrene, 27 grams of t-dodecyl mercaptan, 3.54 kilograms of n-butylacrylate, 272 grams of acrylic acid and 136 grams of methacrylic acid.

After the reactor had been evacuated for 30 minutes, the buffer solution was charged into the reactor. Then 20% of the monomer solution was charged into the reactor. The reactor was heated to a temperature of 165° F. (74° C.) and one-half of the initiator solution was added to the reactor. After about 30 minutes of polymerization the continuous addition of the remaining monomer solution was started. The additional monomer solution was added over a period of about three hours at a rate which was sufficient to maintain a temperature of about 165° F. (74° C. ) in the reactor. The remainder of the initiator solution was charged into the reactor after about two hours of polymerization time. The latex made was suitable for use as the seed polymer latex in the practice of this invention.

EXAMPLE 1

In this experiment, a seed latex was prepared in a 500 gallon (1,893 liter) reactor. In the procedure utilized, a buffer solution was prepared by mixing 1,711 lbs. (776 kg) of soft water, 36.2 lbs (16.4 kg) of a phosphate soap, 395 grams of sodium hydroxide, and 36.2 lbs. (16.4 kg) of dodecanol. The water utilized in making the fubber solution was at a temperature of 80° F. (7° C.). After mixing the buffer solution for about 30 minutes, it was determined to have a pH of 2.6. the buffer solution was then charged into the 500 gallon (1,893 liter) polymerization reactor.

A mixing vessel was evacuated with a vacuum pump to a vacuum of 25 inches of mercury ($8.4 \times 10^4$ Pascals). A monomer mixture was the prepared by charging 1,029 lbs. (467 kg) of styrene, 3,077 lbs. (171 kg) of n-butylacrylate, 29 lbs. (13.1 kg) of acrylic acid, 14.5 lbs. (6.6 kg) of methacrylic acid and 2.9 lbs. (1.3 kg) of t-dodecyl mercaptan into the mixing vessel. The monomer mixture in the mixing vessel was agitated for about 30 minutes. Then 15% of the monomer mixture in the mixing vessel was charged into the polymerization reactor. The contents of the polymerization reactor were agitated and heated to a temperature of 165° F. (74° C.). After the contents of the polymerization reactor reached 165° F. (74° C.), the agitation was continued for about 1 hour with the temperature being maintained at 165° F. (74° C.). Then an aqueous solution containing 5.1 lbs. (2.3 kg) of ammonium persulfat and 101.5 lbs. (46 kg) of soft water was charged into the polymerization reactor.

The polymerization reactor was then filled with nitrogen to a pressure of about 2 psig ($1.15 \times 10^5$ Pascals). The remaining monomer mixture was then metered into the polymerization reactor at a flow rate of 6.9 lbs. per minute (3.1 kg/minutes). Two hours later, 1.9 lbs. (0.86 kg) of ammonium hydroxide was charged into the polymerization reactor to partially neutralize the latex in order to prevent coagulum formation. The polymerization was allowed to continue until the latex reached a constant solids level. At that point, 30 lbs. (13.6 kg) of ammonium hydroxide was charged into the polymerization reactor. The latex was maintained at a temperature of 165° F. (74° C.) until the level of residual styrene in the latex dropped below 500 ppm (parts per million). The latex made by this procedure proved to be a good seed polymer latex. However, coatings made with this latex had inferior crack resistance.

EXAMPLE 2

In this experiment, a latex was prepared in a 500 gallon (1,893 liter) reactor using the technique of this invention. In the procedure utilized, a buffer solution was prepared by mixing 1,711 lbs. (776 kg) of soft water, 36.2 lbs (16.4 kg) of a phospahte soap, 395 grams of sodium hydroxide, and 36.2 lbs. (16.4 kg) of dodecanol. The water utilized in making the buffer solution was at a temperature of 80° F. (27° C.). After mixing the buffer solution for about 30 minutes, it was determined to have a pH of 2.6. The buffer solution was then charged into the 500 gallon (1,893 liter) polymerization reactor.

A mixing vessel was evacuated with a vacuum pump to a vacuum of 25 inches of mercury ($8.4 \times 10^4$ Pascals). A monomer mixture was then prepared by charging 1,029 lbs. (467 kg) of styrene, 3,077 lbs. (171 kg) of n-butylacrylate, 29 lbs. (13.1 kg) of acrylic acid, 14.5 lbs. (6.6 kg) of methacrylic acid and 2.9 lbs. (1.3 kg) of t-dodecyl mercaptan into the mixing vessel. The monomer mixture in the mixing vessel was agitated for abut 30 minutes. Then 15% of the monomer mixture in the mixing vessel was charged into the polymerization reactor. The contents of the polymerization reactor were agitated and heated to a polymerization reactor were agitated and heated to a temperature of 165° F. (74° C.). After the contents of the polymerization reactor reached 165° F. (74° C.), the agitation was continued for about 1 hour with the temperature being maintained at 165° F. (74° C.). Then an aqueous solution containing 5.1 lbs. (2.3 kg) of ammonium persulfate an d101.5 lbs. (46 kg) of soft water was charged into the polymerization reactor. After about 30 minutes 140 lbs. (63.5 kg) of the seed latex prepared by the procedure of Example 1 was charged into the polymerization reactor. The seed latex had a pH of 7 to 9. The polymerization reactor was then filled with nitrogen to a pressure of about 2 psig ($1.15 \times 10^5$ Pascals). The remaining monomer mixture was then metered into the polymerization reactor at a flow rate of 6.9 lbs. per minute (3.1 kg/minutes). Two hours later, 1.9 lbs. (0.86 kg) of ammonium hydroxide was charged into the polymerization reactor to partially neutralize the latex in order to prevent coagulum formation. The polymerization was allowed to continue until the latex reached a constant solids level. At that point, 30 lbs. (13.6 kg) of ammonium hydroxide was charged into the polymerization reactor. The latex was maintained at a temperature of 165° F. (74° C.) until the level of residual styrene in the latex dropped below 500 ppm (parts per million). The latex was then cooled to a temperture of 120° F. (49° C.) and dropped into drums using filter bags to collect any coagulum. Only about 5 lbs. (2.3 kg) of coagulum was collected. The polymerization reactor was flushed with water with agitation being applied. The water was then dropped through filter bags to collect any additional coagulum which had formed. Only 2 additional pounds (0.91 kg) was collected by this reactor flushing procedure. Accordingly, only abut 7 lbs. (3.2 kg) of coagulum was generated utilizing this procedure. The latex had a final pH of about 9.9.

The latex made was evaluated and was found to be outstanding for utilization in preparing coatings for metal substrates. Coatings made with the latex were determined to have the excellent corrosion and rust resistance characteristics of the latices made by the procedure described in U.S. Pat. No. 4,968,741. The latex may by the procedure of this invention additionally proved to have better crack resistance which is believed to be due to a broader particle size distribution. The latex made also proved to be more compatible with alkyd resins which are commonly used in making coating formulations. In any case, this example shows that the procedure of this invention can be used to produce latex on a large scale basis without significant coagulum formation.

EXAMPLE 3

In this experiment a latex was prepared in a 2,750 gallon (10,410 liter) reactor. In the procedure utilized, a buffer solution was prepared by mixing 1,113 gallons (4,213 liters) of water at a temperature of 130° F. (54° C.) with 5.36 lbs. (2.4 kg) of sodium hydroxide and 223 lbs. (101 kg) of a phosphate soap. The sodium hydroxide and phosphate soap were mixed with the water for about 15 minutes and then 223 lbs. (101 kg) of dodecanol was added. The reactor was then heated to a temperature of 165° F. (74° C.) with agitation being applied.

A monomer mixture was prepared by mixing in a mixing vessel 2,231 lbs. (1,053 kg) of n-butyl acrylate, 838 gallons (3,172 liters) of styrene, 89.3 lbs. (40.5 kg) of methacrylic acid, 178.6 lbs. (81.0 kg) of acrylic acid, and 17.8 lbs. (8.1 kg) of t-dodecyl mercaptan. The monomer mixture was agitated for a period of at least 30 minutes and heated to a temperature of 80° F. (27° C.). Then 17 gallons (670 liters) of the monomer mixture was charged into the polymerization reactor which already contained the buffer solution.

The monomers and buffer solution were heated to 165° F. (74° C.) with agitation being continued for 80 minutes. An aqueous ammonium persulfate solution containing 32.5 lbs. (14.7 kg) of ammonium persulfate and 74.9 gallons (284 liters) of water was charged into the reactor without breakign vacuum. After 30 minutes, 855 lbs. (388 kg) of seed latex made utilizing the procedure described in Example 1 was charged into the reactor. Nitrogen was pumped into the reactor to provide a positive pressure of $1.15 \times 10^5$ Pascals to $1.36 \times 10^5$ Pascals. The remaining monomer mixture was charged into the polymerization reactor at a rate of about 5.6 gallons per minute (21.2 liters/minutes). After 2 hours, approximately 570 gallons (2,158 liters) of the monomer mixture had been continuously charged into the reactor. At this point 9.6 lbs. (4.4 kg) of ammonium hydroxide was charged into the reactor to partially neutralize the latex. After 3.5 hours, 981.1 gallons (3,714 liters) of the monomer mixture had been continuously charged into the reactor. Approximately 30 minutes after the monomer addition had been continuously charged into the reactor. Approximately 30 minutes after the monomer addition had been completed, 184.8 lbs. (83.8 kg) of ammonium hydroxide was charged into the reactor. The reactor temperature was maintained at 165° F. (74° C.) until residual styrene levels dropped to below 500 ppm. The pH of the latex synthesized was subsequently adjusted to be within the range of 8.8 to 9.8 by the addition of more ammonium hydroxide. The altex was then discharged from the reactor through a 200 mesh screen. Only 58 lbs. (26.3 kg) of wet coagulum was collected. The latex had a final pH of 9.9, a solids content of 45.7, a viscosity of 90 cps, and contained only 0.044% coagulum per 100 grams of dry rubber. It was determined that the latex contained only 130 ppm of residual n-butylacrylate monomer and 76 ppm of residual styrene monomer.

The latex made utilizing this large commercial scale reaction was determined to be equivalent to the latices made in Example 2. This example clearly shows that stable latices can be made in commercial scale quantities of grater than 2000 gallons (7570 liters) utilizing the techniques of this invention without significant quantities of coagulum being generated.

While certain representative embodiments and details have been shown for the purpose of illustrating the invention, it will be apparent to those skilled in this art that various charges and modifications may be made therein without departing from the scope of the invention.

What is claimed is:

1. A process for producing a neutralized latex that is useful in the manufacture of water reducible coatings which comprises:

(1) free radical aqueous emulsion polymerizing at a pH of less than about 3.5 a monomer mixture which comprises, based on 100 weight percent monomers: (a) at least about 45 weight percent vinyl aromatic monomers, (b) from about 15 to about 50 weight percent of at least one alkyl acrylate monomer, and (c) from about 1 to about 6 weight percent of at least one unsaturated carbonyl compound; in the presence of about 0.5 to 4.0 phm of at least one phosphate ester surfactant in the presence of about 0.5 to 4.0 phm of at least one water insoluble nonionic surface active agent and in the presence of at least one seed polymer which is comprised of repeat units which are derived from at least about 45 weight percent vinyl aromatic monomers, from about 15 to abut 50 weight percent alkyl acrylate monomers, and from about 1 to about 6 weight percent unsaturated carbonyl compounds to produce a latex; and (2) neutralizing the latex with ammonia to a pH which is within the range of about 7 to about 10.5 to produce the neutralized latex.

2. The process as claimed in claim 1 wherein said free radical aqueous emulsion polymerization is conducted at a temperature within the range of about 52° C. to about 88° C.

3. The process as claimed in claim 1 wherein the vinyl aromatic monomer is styrene.

4. The process as claimed in claim 3 wherein the alkyl acrylate monomer is n-butyl arcylate.

5. The process as claimed in claim 4 wherein a combination of acrylic acid and methacrylic acid is utilized as the unsaturated carbonyl compound.

6. The process as claimed in claim 1 wherein the monomer mixture is comprised of (a) from about 65 to about 75 weight percent styrene, (b) from about 22 to about 30 weight percent n-butylacryalt, (c) from about 1 to about 3 weight percent acrylic acid, and (d) from about 0.5 to about 1.5 weight percent methacrylic acid.

7. The process as claimed in claim 1 wherein the water insoluble nonionic surface active agent is a fatty alcohol and wherein the fatty alcohol contains from about 8 to about 22 carbon atoms.

8. The process as claimed in claim 6 wherein the water insoluble nonionic surface active agent is a fatty alcohol and wherein the fatty alcohol contains from about 10 to about 18 carbon atoms.

9. The process as claimed in claim 6 wherein the water insoluble nonionic surface active agent is a fatty alcohol and wherein the fatty alcohol contains from about 12 to about 14 carbon atoms.

10. The process as claimed in claim 8 wherein the water insoluble nonionic surface active agent is a fatty alcohol and wherein the fatty alcohol is present at a level with in the range of about 1 to about 3.5 phm and wherein the phosphate ester surfactant is present at a level with in the range of about 1 to about 3.5 phm.

11. The process as claimed in claim 9 wherein the water insoluble nonionic surface active agent is a fatty alcohol and wherein the fatty alcohol is present at a level within the range of about 2 to about 3 phm and wherein the phosphate ester surfactant is present at a level within the range of about 2 to about 3 phm.

12. The process as claimed in claim 6 wherein said water insoluble nonionic surface active agent is a water insoluble nonionic surfactant having the structural formula:

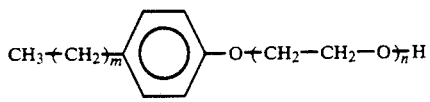

wherein n is an integer from 1 to about 8 and wherein m is an integer from about 6 to about 12.

13. The process as claimed in claim 12 wherein m is 8.

14. The process as claimed in claim 12 wherein m is 9.

15. The process as claimed in claim 6 wherein said water insoluble nonionic surface active agent is a polyol 16. The process as claimed in claim 15 wherein said polyol is a copolymer of ethylene oxide and propylene having a molecular weight of at least about 1500, and wherein said polyol contains less than about 20% bound ethylene oxide.

17. The process as claimed in claim 16 wherein said polyol contains less than about 10% bound ethylene oxide.

* * * * *